United States Patent
Enomoto et al.

(10) Patent No.: US 7,654,134 B2
(45) Date of Patent: *Feb. 2, 2010

(54) AIR FLOW MEASURING DEVICE

(75) Inventors: Takashi Enomoto, Kasugai (JP);
Noboru Kitahara, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/120,882

(22) Filed: May 15, 2008

(65) Prior Publication Data
US 2008/0307867 A1 Dec. 18, 2008

(30) Foreign Application Priority Data
Jun. 14, 2007 (JP) .............................. 2007-157314

(51) Int. Cl.
*G01M 15/00* (2006.01)
(52) U.S. Cl. .................................. 73/114.32
(58) Field of Classification Search ............. 73/114.32, 73/114.34, 202, 202.5, 204.21
See application file for complete search history.

(56) References Cited

U.S. PATENT DOCUMENTS

| | | | |
|---|---|---|---|
| 5,804,718 A * | 9/1998 | Nagasaka et al. ............. 73/202 |
| 6,474,154 B2 * | 11/2002 | Kohmura et al. .............. 73/202 |
| 6,474,177 B2 * | 11/2002 | Maeda et al. ............. 73/861.63 |
| 6,526,822 B1 * | 3/2003 | Maeda et al. ............. 73/204.21 |
| 6,578,414 B2 * | 6/2003 | Kohmura et al. .............. 73/202 |
| 6,619,140 B2 * | 9/2003 | Kitahara et al. .......... 73/861.52 |
| 6,647,776 B2 * | 11/2003 | Kohmura et al. ......... 73/204.21 |
| 6,786,089 B2 * | 9/2004 | Goto et al. ................ 73/204.21 |
| 7,043,978 B2 * | 5/2006 | Goka et al. ................. 73/202.5 |
| 7,089,788 B2 | 8/2006 | Yonezawa |
| 2002/0023485 A1 * | 2/2002 | Kohmura et al. .............. 73/202 |
| 2002/0129648 A1 * | 9/2002 | Kohmura et al. ........... 73/202.5 |
| 2003/0182998 A1 * | 10/2003 | Goto et al. ................ 73/204.21 |
| 2008/0307868 A1 * | 12/2008 | Kitahara .................. 73/114.32 |
| 2008/0307869 A1 * | 12/2008 | Kamiya .................... 73/114.32 |

FOREIGN PATENT DOCUMENTS
JP 2005-140753 6/2005

OTHER PUBLICATIONS
U.S. Appl. No. 12/120,981, Noboru Kitahara, filed May 15, 2008, (JP 2007-157362).
U.S. Appl. No. 12/121,004, Shinichi Kamiya, filed May 15, 2008, (JP 2007-157392).

* cited by examiner

*Primary Examiner*—Lisa M Caputo
*Assistant Examiner*—Freddie Kirkland, III
(74) *Attorney, Agent, or Firm*—Nixon & Vanderhye, PC

(57) ABSTRACT

An air flow measuring device has a throttle portion provided in a first sub-passage, a second sub-passage branched from the first sub-passage at an upstream side of the throttle portion, and a flow amount sensor located in the second sub-passage. The second sub-passage is configured to introduce therein a part of air flowing in the first sub-passage, and an inlet of the second sub-passage is open into the first sub-passage at one side in a first radial direction perpendicular to a flow direction of air flowing in the first sub-passage. Furthermore, the throttle portion is provided to gradually reduce a passage dimension of the first sub-passage in a second radial direction, as toward an outlet of the first sub-passage. Here, the second radial direction is perpendicular to a surface defined by the first radial direction and the flow direction of air in the first sub-passage.

11 Claims, 2 Drawing Sheets

# AIR FLOW MEASURING DEVICE

CROSS REFERENCE TO RELATED APPLICATION

This application is based on Japanese Patent Application No. 2007-157314 filed on Jun. 14, 2007, the contents of which are incorporated herein by reference in its entirety.

BACKGROUND OF THE INVENTION

1. Field of the Invention

The present invention relates to an air flow measuring device having a first sub-passage configured to introduce therein a part of air flowing in an interior of a duct, a second sub-passage configured to introduce therein a part of air flowing in the first sub-passage, and a flow amount sensor located in the second sub-passage to measure a flow amount of air.

2. Description of the Related Art

An air flow measuring device described in U.S. Pat. No. 7,089,788 (corresponding to JP 2005-140753A) is provided for measuring a flow amount of intake air flowing into an internal combustion engine. As shown in FIG. 3, the air flow measuring device includes a sensor body 110 disposed in an intake air passage 100 of the internal combustion engine. The sensor body 110 is provided with a first sub-passage 120 into which a part of air flowing in the intake air passage 100 is introduced, and a second sub-passage 130 into which a part of air flowing in the first sub-passage 120 is introduced. A flow amount sensor 140 is located in the second sub-passage 130. The second sub-passage 130 is formed into approximately a U-shape around a partition wall 150. Furthermore, a protrusion plate 150a is provided to protrude from the partition wall 150 into the first sub-passage 120 so that the dynamic pressure of air flowing in the first sub-passage 120 is received by the protrusion plate 150a. Therefore, a pressure difference between an inlet side and an outlet side of the first sub-passage 120 is increased, and thereby it is possible to introduce a sufficient flow amount of air into the second sub-passage 130 from the first sub-passage 120.

In the flow amount measuring device, when dust contained in air passes in the first sub-passage 120, the dust collides with the protrusion plate 150 protruding into the interior of the first sub-passage 120, bounces on the protrusion plate 150 and enters the second sub-passage 130, as in the arrows shown in FIG. 3. The dust entering the second sub-passage 130 may collides with the flow amount sensor 140 located in the second sub-passage 130. In particular, when a thin film-like measuring element is used in the flow amount sensor 140, the measuring element is easily damaged by the collision with the dust.

SUMMARY OF THE INVENTION

In view of the foregoing problems, it is an object of the present invention to provide an air flow measuring device, which can prevent dust contained in air from colliding with a flow amount sensor.

It is another object of the present invention to provide an air flow measuring device, which can effectively reduce dust entering from a first sub-passage portion into a second sub-passage portion so as to restrict a collision of dust with a flow amount sensor.

According to an aspect of the present invention, an air flow measuring device for measuring a flow amount of air flowing in an interior of a duct includes a first sub-passage portion configured to introduce therein a part of air flowing in the duct, a throttle portion provided in the first sub-passage portion to gradually reduce a passage sectional area of the first sub-passage portion as toward an outlet of the first sub-passage portion, a second sub-passage portion branched from the first sub-passage portion at an upstream side of the throttle portion in a flow direction of air flowing in the first sub-passage portion, and a flow amount sensor located in the second sub-passage portion to measure a flow amount of air flowing in the second sub-passage portion. The second sub-passage portion is configured to introduce therein a part of air flowing in the first sub-passage portion, the second sub-passage portion has an inlet at which the second sub-passage portion is branched from the first sub-passage portion, and the inlet of the second sub-passage portion is open into the first sub-passage portion at one side in a first radial direction that is perpendicular to a flow direction of air flowing in the first sub-passage portion. Furthermore, the throttle portion is provided to gradually reduce a passage dimension of the first sub-passage portion in a second radial direction, as toward the outlet of the first sub-passage portion. Here, the second radial direction is perpendicular to a surface defined by the first radial direction and the flow direction of air flowing in the first sub-passage portion.

Because the throttle portion is provided to gradually reduce a passage dimension of the first sub-passage portion in the second radial direction as toward the outlet of the first sub-passage portion, dust does not fly into the inlet of the second sub-passage portion even when the dust collides with the throttle portion. Accordingly, it can restrict the dust from entering into the second sub-passage portion, thereby preventing the dust from colliding with the flow amount sensor.

For example, the throttle portion is constructed of a pair of wall portions extending in a direction parallel to the first radial direction. In this case, the pair of wall portions is located to gradually reduce a distance between the wall portions as toward the outlet of the first sub-passage portion.

Furthermore, the air flow measuring device may be used for an internal combustion engine, as an example.

BRIEF DESCRIPTION OF THE DRAWINGS

Additional objects and advantages of the present invention will be more readily apparent from the following detailed description of preferred embodiments when taken together with the accompanying drawings. In which.

DETAILED DESCRIPTION OF THE PREFERRED EMBODIMENTS

Figure 1:
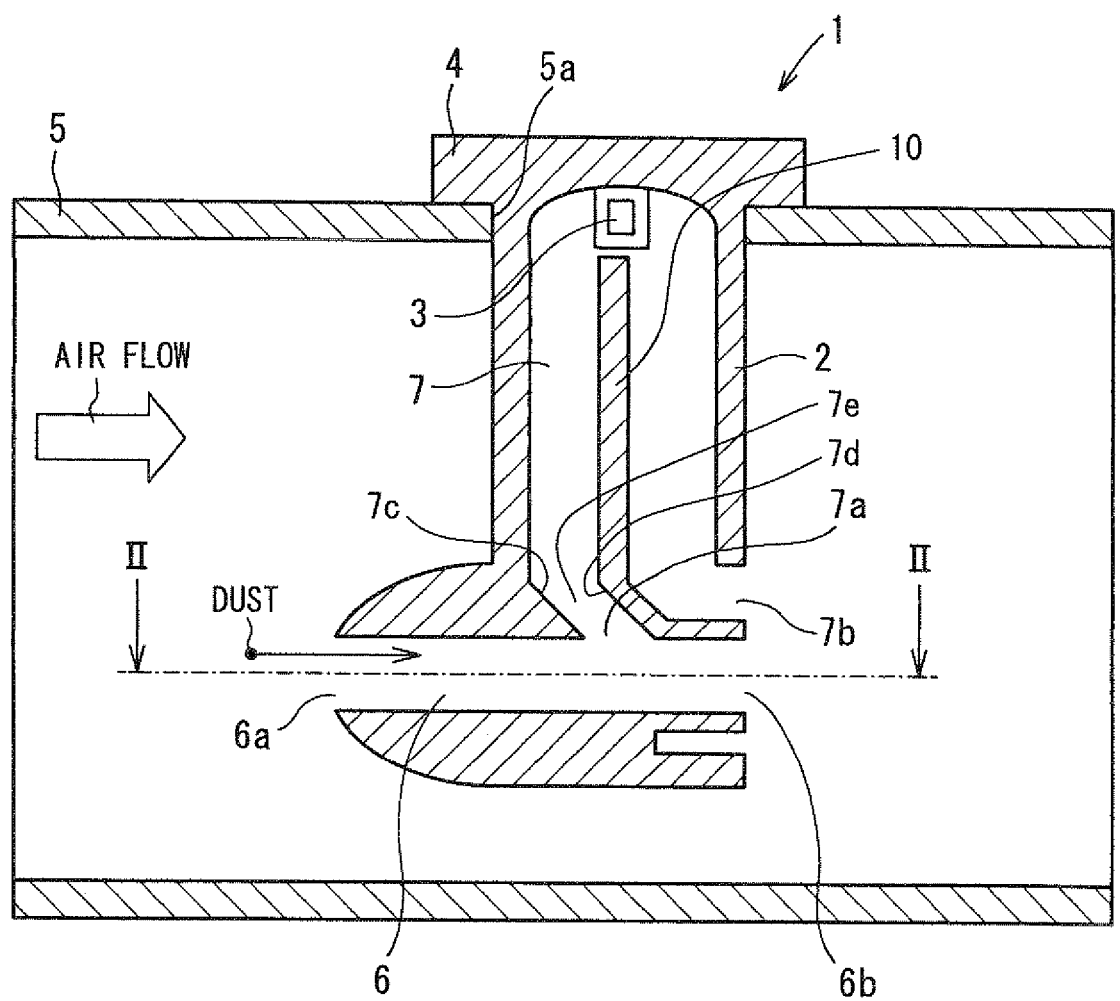
FIG. 1 is a cross sectional view showing an air flow measuring device according to an embodiment of the present invention.
Figure 2A:
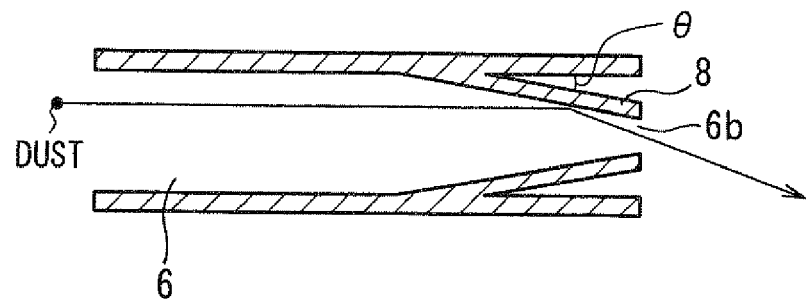
FIG. 2A is a cross sectional view taken along the line II-II in FIG. 1 and showing an example of a throttle portion in a first sub-passage.
Figure 2B:
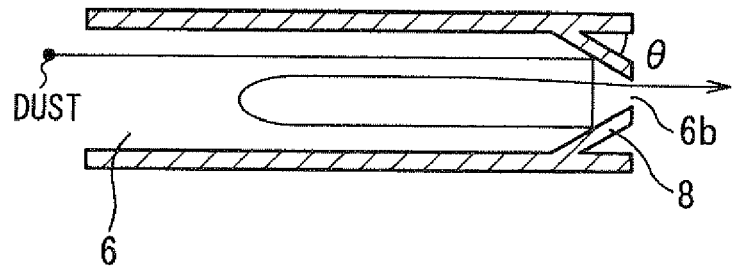
FIG. 2B is a cross sectional view taken along the line II-II in FIG. 1 and showing another example of the throttle portion in the first sub-passage.
Figure 3:
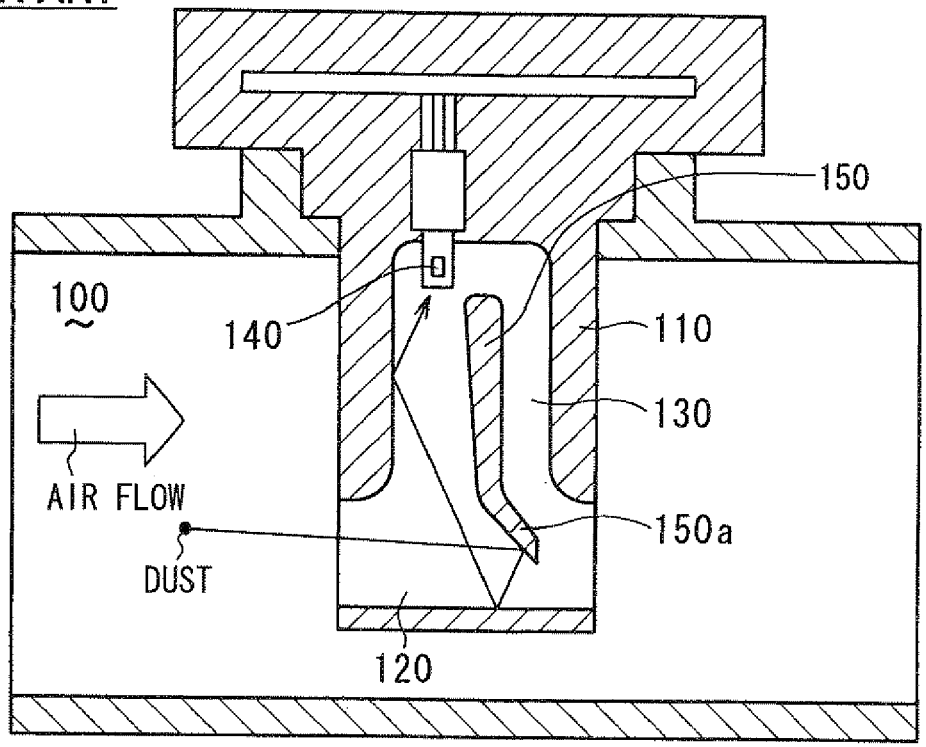
FIG. 3 is a cross sectional view showing an air flow measuring device in a prior art.

An air flow measuring device 1 of an embodiment will be now described with referent to FIGS. 1, 2A and 2B. For example, the air flow measuring device 1 can be used as an air flow meter for measuring a flow amount of intake air in an internal combustion engine for a vehicle. The air flow measuring device 1 includes a sensor body 2, a flow amount sensor 3 and a circular module 4.

The sensor body 2 is inserted into an interior of an intake air duct 5 of the engine. Air flows into an intake air port of the engine through the intake air duct 5. The intake air duct 5 has an attachment hole portion 5a into which the sensor body 2 is fitted after the sensor body 2 is inserted into the interior of the intake air duct 5. The sensor body 2 is provided with a first sub-passage 6 into which a part of air flowing in the intake air duct 5 is introduced, and a second sub-passage 7 into which a part of air flowing in the first sub-passage 6 is introduced.

In the example of FIG. 1, air flows through the intake air duct 5 from the left side toward the right side. The first sub-passage 6 has an inlet 6a that is open toward an upstream air side (i.e., left side in FIG. 1) of the intake air duct 5, and an outlet 6b that is open toward a downstream air side (i.e., right side in FIG. 1) of the intake air duct 5. The first sub-passage 6 is formed to extend approximately in a straight line from the inlet 6a to the outlet 6b along the flow direction of air in the intake air duct 5. Furthermore, an outlet side of the first sub-passage 6a is provided with a throttle portion (i.e., passage-area reducing portion) in which a passage sectional area of the first sub-passage 6a is gradually reduced as toward the outlet 6b of the first sub-passage 6.

The second sub-passage 7 has an inlet 7a branched from the first sub-passage 6, and an outlet 7b opened toward the downstream air side of the intake air duct 5 at a position adjacent to the outlet 6b of the first sub-passage 6. The outlet 7b is formed into approximately a circular shape around the outlet 6b of the first sub-passage 6. A partition wall 10 is located in the sensor body 2 so that the second sub-passage 7 is formed to be approximately U-turned from the inlet 7a to the outlet 7b. In this embodiment, the flow direction of air flowing into the inlet 7a is turned substantially by 180° in the second sub-passage 7 at one end side opposite to the inlet 7a and the outlet 7b. The partition wall 10 is spaced from the inner wall of the second body 2 to form a turning portion at the one end side opposite to the inlet 7a and the outlet 7b. The partition wall 10 extends in a direction approximately perpendicular to the flow direction of air in the first sub-passage 6. A tilt surface 7d is located to be tilted from the extending direction of the partition wall 10.

The flow amount sensor 3 measures and detects a flow amount of air flowing through the second sub-passage 7, and outputs the detected flow amount as an electrical signal (e.g., electrical voltage signal). For example, the flow amount sensor 3 includes a temperature sensing element and a heat generating element formed on a surface of a semiconductor substrate by a thin film resistor (not shown). The heat generating element and the temperature sensing element are connected to a circuit substrate (not shown) located inside the circuit module 4. As an example, the flow amount sensor 3 is located at the U-turning portion of the second sub-passage 7, as shown in FIG. 1.

The circuit module 4 is formed integrally with the sensor body 2, and is located outside of the intake air duct 5. The circuit module 4 controls an electrical current value applied to the heat generating element so that a difference between the temperature of the heat generating element and air temperature detected by the temperature sensing element becomes constant.

Next, the throttle portion (passage-area reducing portion) provided at the outlet side in the first sub-passage 6 will be described.

In this embodiment, a first radial direction of the first sub-passage 6 indicates the top-bottom direction of FIG. 1, and a second radial direction of the first sub-passage 6 indicates a radial direction perpendicular to a surface defined by the top-bottom direction shown in FIG. 1 and the flow direction of air in the first sub-passage 6. In FIG. 1, the first radial direction of the first sub-passage 6 corresponds the extending direction of the partition wall 10, and the second radial direction of the first sub-passage 6 corresponds to a direction parallel to the face-back direction of the paper of FIG. 1.

As shown in FIG. 2A or 2B, a pair of wall portions 8 are provided in the first sub-passage 6 to gradually reduce a passage sectional dimension in the second radial direction as toward the outlet 6b. FIG. 2A is an example of the pair of wall portions 8 of the embodiment, and FIG. 2B is another example of the pair of wall portions 8 of the embodiment. The wall portions 8 are provided to extend in a direction parallel to the first radial direction (i.e., top-bottom direction of FIG. 1). As shown in FIGS. 2A and 2B, the wall portions 8 are tilted with respect to the axial line of the first sub-passage 6, such that the clearance between the wall portions 8 in the second radial direction is gradually reduced as toward downstream, and the outlet 6b is formed at the downstream end side of the wall portions 8. That is, the throttle portion is formed by the wall portions 8 in an area near the outlet 6b.

In this embodiment, the partition wall 10 does not protrude into the first sub-passage 6 in the first radial direction (i.e., top-bottom direction in FIG. 1). That is, the tilt surface 7d tilted to a downstream air side of the first sub-passage 6 with respect to the partition wall 10 is not protruded into the first sub-passage 6 in the first radial direction. Furthermore, a wall surface 7c is provided in the sensor body 2, and is tilted approximately in parallel to the tilt surface 7d. Therefore, air flowing from the first sub-passage 6 to the second sub-passage 7 is bent by an acute angle smaller than the right angle, and thereby it is difficult for the dust contained in the air to enter from the first sub-passage 6 into the second sub-passage 7 through the inlet 7a.

Next, operation of the air flow measuring device 1 will be described.

When air flows in the intake air duct 5 when operation of the engine is started, a part of air in the intake air duct 5 is introduced into the first sub-passage 6 of the sensor body 2, and a part of air flowing in the first sub-passage 6 is introduced into the second sub-passage 7. The flow amount sensor 3 located in the second sub-passage 7 is set such that the heat radiating amount of the heat generating element of the flow amount sensor 3 becomes larger as the flow speed of air flowing in the second sub-passage 7 becomes larger. Therefore, in the flow amount sensor 3, the electrical current value applied to the heat generating element is made larger as the flow speed of air in the second sub-passage 7 becomes larger, so that the temperature difference between the temperature of the heat generating element and the air temperature detected by the temperature sensing element becomes constant. In contrast, when the flow amount of air flowing in the second sub-passage 7 becomes smaller, the heat radiating amount of the heat generating element is decreased, thereby the electrical current value applied to the heat generating element becomes smaller. An electrical signal (e.g., electrical current signal) corresponding to the electrical current value applied to the heat generating element is output from the circuit module 4 to an exterior ECU (i.e., electronic control unit) so that the flow amount of the intake air is measured by the ECU.

In the air flow measuring device 1 of the embodiment, the throttle portion is provided in the first sub-passage 6 at a downstream end side (outlet side), thereby increasing the pressure difference between the inlet side and the outlet side of the first sub-passage 6. As a result, an air amount that is sufficient for the measuring at the flow amount sensor 3 can flow into the second sub-passage 7 from the first sub-passage 6, and thereby the detection accuracy of the flow amount sensor 3 can be made stable.

The throttle portion is constructed of the pair of wall portions 8 provided at two sides of the axial line of the first sub-passage 6 in the second radial direction. The wall portions 8 are provided in the first sub-passage 6 at a downstream side of the branch portion (i.e., inlet 7a) in the flow direction of air in the first sub-passage 6, so as to gradually reduce the passage sectional area of the first sub-passage 6 as toward the outlet 6b of the first sub-passage 6. In this embodiment, a throttle portion for reducing the passage sectional area of the first sub-passage 6 is not provided in the first radial direction (i.e., top-bottom direction) where the inlet 7a of the second sub-passage 7 is open. Therefore, even when the dust contained in air collides with the wall portion 8, the dust does not fly toward the first radial direction (i.e., top-bottom direction) of the first sub-passage 6, in which the inlet 7a of the second sub-passage 7 is opened, but flows out of the outlet 6b of the first sub-passage 6, as shown in FIG. 2A. Accordingly, it can restrict the dust contained in air from entering into the second sub-passage 7 from the first sub-passage 6, thereby restricting the dust from colliding with the flow amount sensor 3.

FIG. 2B shows a case where a tilt angle θ of the wall portion 8 is larger than that in the example of FIG. 2A. As shown in FIG. 2B, when the tilt angle θ of the wall portion 8 relative to a direction parallel to the axial line of the first sub-passage 6 is made larger, dust hits the wall portion 8 and bounds toward the upstream air side (i.e., inlet side) in the first sub-passage 6. However, in this case, as shown by the arrow in FIG. 2B, the dust only bounds back in a surface including the second radial direction, without bounding back to the first radial direction where the inlet 7a of the second sub-passage 7 is open. Thus, as shown in FIG. 2B, the dust flying back toward the upstream side (inlet side) of the first sub-passage 6 is U-turned to flow again toward the outlet 6b of the first sub-passage 6. Accordingly, it can restrict the dust flowing together with air in the first sub-passage 6 from entering into the second sub-passage 7, thereby preventing the dust from colliding with the flow amount sensor 3. As a result, it can prevent a damage of the thin film resistor that is used for the flow amount sensor 3.

Furthermore, in the above embodiment, the inlet passage 7e having the inlet 7a of the second sub-passage 7 is tilted relative to the first radial direction of the first sub-passage 6 such that the inlet passage 7e of the second sub-passage 7 is positioned upstream from the inlet 7a in the flow direction of air in the first sub-passage 6. Thus, dust contained in air is difficult to enter the inlet passage 7e of the second sub-passage 7 because of the inertial force of the flow of the dust in the first sub-passage 7.

In addition, in the above-described embodiment, the inlet 7a of the second sub-passage 7 is open in the first radial direction, and the inner wall surface of the first sub-passage 6 does not protrude into the first sub-passage 6 in the first radial direction of the first sub-passage 6. That is, the first sub-passage 6 has a radial dimension in the first radial direction, that is approximately constant from the inlet 6a of the first sub-passage 6 to the outlet 6b of the first sub-passage 6. Therefore, it can restrict the dust from entering into the second sub-passage 7 after collision with a wall portion of the first sub-passage 6.

In the above-described embodiment, the air flow measuring device 1 includes the first sub-passage 6 configured to introduce therein a part of air flowing in the duct 5, the throttle portion provided in the first sub-passage 6 to gradually reduce a passage sectional area of the first sub-passage 6 as toward the outlet 6b of the first sub-passage 6, the second sub-passage 7 branched from the first sub-passage 6 at an upstream side of the throttle portion in the flow direction of air flowing in the first sub-passage 6, and the flow amount sensor 3 located in the second sub-passage 7 to measure a flow amount of air flowing in the second sub-passage 7. The second sub-passage 7 is configured to introduce therein a part of air flowing in the first sub-passage 6, and the second sub-passage 7 has the inlet 7a at which the second sub-passage 7 is branched from the first sub-passage 6. Furthermore, the inlet 7a of the second sub-passage 7 is open into the first sub-passage 6 at one side in the first radial direction that is perpendicular to the flow direction of air flowing in the first sub-passage 6. In addition, the throttle portion is provided to gradually reduce a passage dimension of the first sub-passage 6 in the second radial direction, as toward the outlet 6b of the first sub-passage 6. Here, the second radial direction is perpendicular to a surface defined by the first radial direction and the flow direction of air flowing in the first sub-passage 6. Thus, it is possible to increase the pressure different between the inlet side and the outlet side of the first sub-passage 6, and thereby a sufficient air amount can be introduced into the second sub-passage 7. Because the throttle portion is provided to gradually reduce the passage dimension of the first sub-passage 6 in the second radial direction as toward the outlet 6b of the first sub-passage 6, dust does not fly into the inlet 7a of the second sub-passage 7 even when the dust collides with the throttle portion. Accordingly, it can restrict the dust from entering into the second sub-passage 7, thereby preventing the dust from colliding with the flow amount sensor 3.

For example, the throttle portion can be constructed of the pair of wall portions 8 extending in a direction parallel to the first radial direction. In this case, the pair of wall portions 8 can be located to gradually reduce a distance between the wall portions 8 as toward the outlet 6b of the first sub-passage 6.

Furthermore, the second sub-passage 7 may have an inlet passage 7e that is provided outside of the first sub-passage 6 to extend from the inlet 7a of the second sub-passage 7. In this case, the inlet passage 7e extending downstream in the second sub-passage 7 from the inlet 7a of the second sub-passage 7 is tilted, relative to the first radial direction, in a tilt direction toward an upstream side of air in the first sub-passage 6. Accordingly, dust contained in the air flowing in the first sub-passage 6 is difficult to flow into the second sub-passage 7.

OTHER EMBODIMENTS

Although the present invention has been fully described in connection with the preferred embodiments thereof with reference to the accompanying drawings, it is to be noted that various changes and modifications will become apparent to those skilled in the art.

For example, in the above-described embodiment, the flow amount sensor 3 is located at the U-turning portion of the second sub-passage 7. However, the flow amount sensor 3 may be located at a position upstream from the U-turning portion in the second sub-passage 7, or may be located at other position in the second sub-passage 7.

Such changes and modifications are to be understood as being within the scope of the present invention as defined by the appended claims.

What is claimed is:

1. An air flow measuring device for measuring a flow amount of air flowing in an interior of a duct, the air flow measuring device comprising:

a first sub-passage portion configured to introduce therein a part of air flowing in the duct;

a throttle portion provided in the first sub-passage portion to gradually reduce a passage sectional area of the first sub-passage portion as toward an outlet of the first sub-passage portion;

a second sub-passage portion branched from the first sub-passage portion at an upstream side of the throttle portion in a flow direction of air flowing in the first sub-passage portion, the second sub-passage portion being configured to introduce therein a part of air flowing in the first sub-passage portion; and a flow amount sensor located in the second sub-passage portion to measure a flow amount of air flowing in the second sub-passage portion, wherein:

the second sub-passage portion has an inlet at which the second sub-passage portion is branched from the first sub-passage portion;

the inlet of the second sub-passage portion is open into the first sub-passage portion at one side in a first radial direction that is perpendicular to a flow direction of air flowing in the first sub-passage portion;

the throttle portion is provided to gradually reduce a passage dimension of the first sub-passage portion in a second radial direction, as toward the outlet of the first sub-passage portion, the second radial direction being perpendicular to a first plane extending in the first radial direction and extending in the flow direction of air flowing in the first sub-passage portion;

the throttle portion is provided solely along a downstream side portion in the first sub-passage portion, downstream of the opening of the inlet of the second sub-passage portion; and the first sub-passage portion has a substantially constant passage dimension in the first radial direction along the downstream side portion to the outlet of the first sub-passage portion.

2. The air flow measuring device according to claim 1, wherein:

the throttle portion is constructed of a pair of wall portions, each extending from respective walls of said first sub-passage portion in a direction downstream and toward a center axis of said passage to gradually reduce a distance between the wall portions as toward the outlet of the first sub-passage portion.

3. The air flow measuring device according to claim 2, wherein each of said wall portions is planar and oriented in parallel to the first radial direction.

4. The air flow measuring device according to claim 1, wherein:

the second sub-passage portion has an inlet passage that is provided outside of the first sub-passage portion to extend from the inlet of the second sub-passage portion; and the inlet passage extending downstream in the second sub-passage portion from the inlet of the second sub-passage portion is tilted, relative to the first radial direction, such that the inlet passage of the second sub-passage is positioned upstream from the inlet of the second sub-passage portion in the flow direction of air in the first sub-passage portion.

5. The air flow measuring device according to claim 1, wherein:

the duct is configured to define therein an intake air passage communicating with an intake air port of an internal combustion engine, such that the air flowing in the duct flows into the internal combustion engine.

6. The air flow measuring device according to claim 1, wherein:

the first sub-passage portion has a substantially constant passage diameter in said first plane, along said downstream side portion to the outlet of the first sub-passage portion.

7. The air flow measuring device according to claim 1, wherein the second sub-passage portion has an outlet open at a position adjacent to the outlet of the first sub-passage portion.

8. The air flow measuring device according to claim 7, wherein the outlet of the second sub-passage portion is formed into approximately a circular shape around the outlet of the first sub-passage portion.

9. The air flow measuring device according to claim 1, further comprising a partition wall so that the second sub-passage portion is formed to be approximately U-turned from the inlet thereof to an outlet thereof so that the flow direction of air flowing into the inlet of the second sub-passage portion is turned substantially by 180° in the second sub-passage portion at an end side opposite to the inlet and the outlet.

10. The air flow measuring device according to claim 9, wherein the partition wall is spaced from an inner wall remote from the inlet and the outlet to form a turning portion at said end side opposite to the inlet and the outlet.

11. The air flow measuring device according to claim 9, wherein the partition wall extends in a direction approximately perpendicular to the flow direction of air in the first sub-passage portion.

* * * * *